(12) United States Patent
Roeder et al.

(10) Patent No.: US 9,308,804 B2
(45) Date of Patent: Apr. 12, 2016

(54) METHOD OF ATTACHING FUNCTIONAL COMPONENTS TO A ROOF ELEMENT OF A VEHICLE, AND VEHICLE ROOF ELEMENT

(71) Applicants: Joachim Roeder, Muehlheim (DE); Stefan Vogel, Ortenberg (DE); Martin Niscack, Bratislava (SK); Pavol Hurban, Malacky (SK); Andre Schaper, Vechelde (DE); Andreas Kunze, Muenden/Aller (DE); Charles Wassen, Bratislava (SK)

(72) Inventors: Joachim Roeder, Muehlheim (DE); Stefan Vogel, Ortenberg (DE); Martin Niscack, Bratislava (SK); Pavol Hurban, Malacky (SK); Andre Schaper, Vechelde (DE); Andreas Kunze, Muenden/Aller (DE); Charles Wassen, Bratislava (SK)

(73) Assignee: ROOF SYSTEMS GERMANY GMBH (DE)

( * ) Notice: Subject to any disclaimer, the term of this patent is extended or adjusted under 35 U.S.C. 154(b) by 0 days.

(21) Appl. No.: 13/765,362

(22) Filed: Feb. 12, 2013

(65) Prior Publication Data

US 2014/0049076 A1   Feb. 20, 2014

(30) Foreign Application Priority Data

Feb. 16, 2012   (DE) .......................... 10 2012 003 045

(51) Int. Cl.
*B60J 10/00* (2006.01)
*B29C 65/70* (2006.01)
(Continued)

(52) U.S. Cl.
CPC ............. *B60J 10/0002* (2013.01); *B29C 39/10* (2013.01); *B29C 41/20* (2013.01); *B29C 44/1271* (2013.01); *B29C 65/70* (2013.01); *B29C 70/763* (2013.01); *B29K 2875/00* (2013.01); *B29L 2031/3005* (2013.01); *B60J 7/00* (2013.01); *Y10T 29/4998* (2015.01);
(Continued)

(58) Field of Classification Search
CPC ......... B60J 10/0002; B60J 7/00; B29C 41/20; B29C 65/70; B29C 70/763; B29C 44/1271; B29C 39/10; Y10T 29/49888; Y10T 29/49885; Y10T 29/4998; Y10T 29/49622; B29K 2875/00; B29L 2031/3005
USPC ......... 29/897.2, 527.1, 458, 460; 296/216.09, 296/93, 210, 216.01, 222, 216.04, 216.06, 296/216.07; 264/255, 252
See application file for complete search history.

(56) References Cited

U.S. PATENT DOCUMENTS 2,852,292 A * 9/1958 Galla .............................. 292/25
4,783,117 A   11/1988 Nagata
(Continued)

FOREIGN PATENT DOCUMENTS

CN   1489532 A   4/2004
DE   37 42 719 A1   7/1989
(Continued)

OTHER PUBLICATIONS

Search Report for Dutch Patent Application 2010251.
(Continued)

*Primary Examiner* — John C Hong
(74) *Attorney, Agent, or Firm* — Cantor Colburn LLP (57) ABSTRACT

A method of attaching functional components to a roof element of a vehicle is provided. The method including the steps of: applying a curable material in a low-viscosity state which is molded in sections by a first mold surface, wherein a second mold surface is used for further shaping sections of the curable material, and wherein an opening remains accessible towards an environment through which the curable material is introduced.

19 Claims, 8 Drawing Sheets

(51) Int. Cl.
  *B29C 39/10* (2006.01)
  *B29C 44/12* (2006.01)
  *B29C 70/76* (2006.01)
  *B29C 41/20* (2006.01)
  *B29L 31/30* (2006.01)
  *B60J 7/00* (2006.01)

(52) U.S. Cl.
  CPC ..... *Y10T 29/49622* (2015.01); *Y10T 29/49885* (2015.01); *Y10T 29/49888* (2015.01)

(56) References Cited

U.S. PATENT DOCUMENTS

| | | | |
|---|---|---|---|
| 4,925,511 A | | 5/1990 | Ikeda et al. |
| 4,971,308 A | | 11/1990 | Herlemann et al. |
| 5,421,940 A | * | 6/1995 | Cornils et al. ........... 156/244.11 |
| 5,655,341 A | | 8/1997 | Jaffiol et al. |
| 6,086,695 A | | 7/2000 | Kreye |
| 6,283,542 B1 | | 9/2001 | Patz |
| 6,378,936 B1 | * | 4/2002 | Grimm et al. ................ 296/214 |
| 6,926,335 B2 | | 8/2005 | Orten et al. |
| 7,264,307 B2 | | 9/2007 | Betzl et al. |
| 2001/0035665 A1 | | 11/2001 | Hartmann et al. |
| 2004/0118079 A1 | | 6/2004 | Orten et al. |
| 2005/0218557 A1 | | 10/2005 | Orten et al. |
| 2005/0221060 A1 | | 10/2005 | Orten et al. |
| 2005/0225125 A1 | * | 10/2005 | Betzl et al. ............... 296/216.08 |
| 2007/0075904 A1 | * | 4/2007 | Blickle ........................ 343/715 |
| 2012/0205940 A1 | | 8/2012 | Sitterlet et al. |

FOREIGN PATENT DOCUMENTS

| | | |
|---|---|---|
| DE | 197 21 566 A1 | 12/1997 |
| DE | 197 25 777 A1 | 12/1998 |
| DE | 101 03 865 C1 | 5/2002 |
| DE | 101 54 553 A1 | 5/2003 |
| DE | 20 2005 002900 U1 | 6/2005 |
| EP | 0 412 299 A2 | 2/1991 |
| EP | 1 310 394 A1 | 5/2003 |
| EP | 1 577 080 A1 | 9/2005 |

OTHER PUBLICATIONS

Chinese Office Action for Application No. 201310049443.5; Date of Issue Dec. 4, 2015.
English Translation for Chinese Office Action for Application No. 2013100494435; Date of Issue Dec. 4, 2015.
English Translation for CN1489532.

* cited by examiner

METHOD OF ATTACHING FUNCTIONAL COMPONENTS TO A ROOF ELEMENT OF A VEHICLE, AND VEHICLE ROOF ELEMENT

CROSS REFERENCE TO RELATED APPLICATIONS

This application claims foreign priority to DE 10 2012 003 045.2 filed Feb. 16, 2012, under 35 U.S.C. §119, the contents of which are incorporated herein by reference thereto.

TECHNICAL FIELD

The invention relates to a method of attaching functional components to a roof element of a vehicle, including applying a curable material in a low-viscosity state which is molded in sections by means of a first mold surface. The invention further relates to a roof element for a vehicle.

BACKGROUND

The roof element may, more particularly, be a cover or a module element as are used in modern motor vehicles. The cover is usually part of a sliding roof here and can be shifted between a closed position and various open positions by a suitable mechanism. The module element may be configured to be panel-shaped and constitute a stationary part of the vehicle roof, for example the stationary parts of the roof skin that are arranged laterally of a sliding roof cover, or the part arranged behind the sliding roof cover, as viewed in the direction of travel.

It is known that a so-called foamed casing or portion can be used for covers of sliding roofs, in particular glass covers, which in most cases consists of polyurethane. The latter is introduced into a foaming mold so that a polyurethane frame or other polyurethane formations are formed which firmly adhere to the cover. A disadvantage here is the fairly great effort involved in producing the foaming molds, which are required to ensure the necessary sealing action in view of the foaming pressure occurring, so that the polyurethane cannot reach any surfaces where it impairs the function and/or the visual appearance of the cover.

EP 1 577 080 discloses a method of manufacturing a gasket on a glass cover, in which polyurethane is applied in a spraying method. In this process, the cover is placed into an open mold having a mold surface onto which the curable polyurethane is sprayed. This allows, in particular, a frame to be obtained that surrounds the cover on all sides. Here, the mold surface is formed in a mold part made from a resilient material, for example silicone, so that a good sealing action on the cover is achieved.

A drawback of this method is that only few geometries are possible, namely those that are feasible when using a dish-like mold part which holds the very flowable polyurethane.

SUMMARY OF THE INVENTION

One object of the invention resides in further developing the method of the type initially mentioned in such a way as to also allow more complex geometries to be configured from the curable material on the roof element with little effort.

To achieve this object, according to various embodiments of the invention provision is made in a method of the type initially mentioned that a second mold surface is used which serves for shaping further sections of the curable material, an opening remaining accessible towards the environment through which the curable material can be introduced. Furthermore, embodiments of the invention provide a roof element manufactured by means of such a method. Embodiments of the invention are based on the finding that the advantages of the two methods described above can be combined with each other. The use of more than one mold surfaces allows more complex geometries to be produced than can be produced when an open, dish-like mold part is used. It is not required, however, to use a closed molding tool here; rather, the method can be carried out in an open system in which mold surfaces are provided at those places where necessary but, basically, the curable material is introduced freely, more particularly can flow in freely.

According to a further configuration of the invention, provision is made that the first mold surface is formed on a first mold part. This mold part can be made use of in particular for molding from outer contours that are exposed later.

It is also possible for the first mold surface to be formed on a functional part which is firmly connected with the roof element by means of the curable material. In this configuration, the functional part to be attached is used for limiting the spreading of the curable material. At the same time, the functional part is firmly connected with the roof element by means of the curable material.

According to one embodiment of the invention, provision is made that the second mold surface is formed on a second mold part. This allows a plurality of mutually independent mold surfaces to be used for shaping the curable material.

According to a further configuration of the invention, provision is made that the second mold part is brought into position after part of the curable material was applied onto the first mold surface. This allows the curable material to be first applied freely and without hindrance onto a surface to be coated, for example by means of a spraying method, and the second mold part to be brought into position only subsequently. The second mold surface of the second mold part then provides for the desired contour of the curable material. In this way, it is also possible to produce geometries which would not otherwise be producible when using the low-viscosity curable material, for example because the material would not fully flow into the dedicated space between the roof element and the mold surface.

According to one configuration of the invention, provision is made that the second mold part is used to hold in position the functional component to be attached. This ensures a high positional accuracy of the mold part to be inserted in relation to the geometries generated by the mold surfaces.

Preferably, the curable material is polyurethane. This material has turned out to be particularly suitable with regard to its properties and its processing options.

The functional part may be an integral part of the cured material. For example, the functional part may be an adhesive surface by means of which the roof element can be adhesively bonded to a vehicle structure, or a sealing lip that serves to seal against other structural parts.

The functional part may also be a separate component, for example a spacer, a rail, a centering pin, or a screw-on dome. Such a functional part can be reliably attached to the roof element with high precision and a high holding force in the manner described, involving little effort.

In one embodiment, a method of attaching functional components to a roof element of a vehicle is provided. The method including the steps of applying a curable material in a low-viscosity state which is molded in sections by means of a first mold surface, wherein a second mold surface is used which serves for shaping further sections of the curable material, an opening remaining accessible towards the environment through which the curable material can be introduced.

In another embodiment, a roof element for a vehicle roof is provided. The roof element having a functional component attached thereto by a method including the steps of: applying a curable material to a portion of the roof element in a low-viscosity state; molding the curable material in sections by a first mold surface and a second mold surface, wherein the second mold surface is defined by a pair mold parts, wherein one of the pair of mold parts is applied to the curable material after it has been applied to the portion of the roof element and an opening remains between the pair of mold parts after they are applied to the curable material, wherein the opening is accessible towards the environment through which the curable material can be introduced.

BRIEF DESCRIPTION OF THE DRAWINGS

The invention will be described below with reference to various embodiments, which are illustrated in the accompanying drawings, in which.

DETAILED DESCRIPTION

Figure 1:
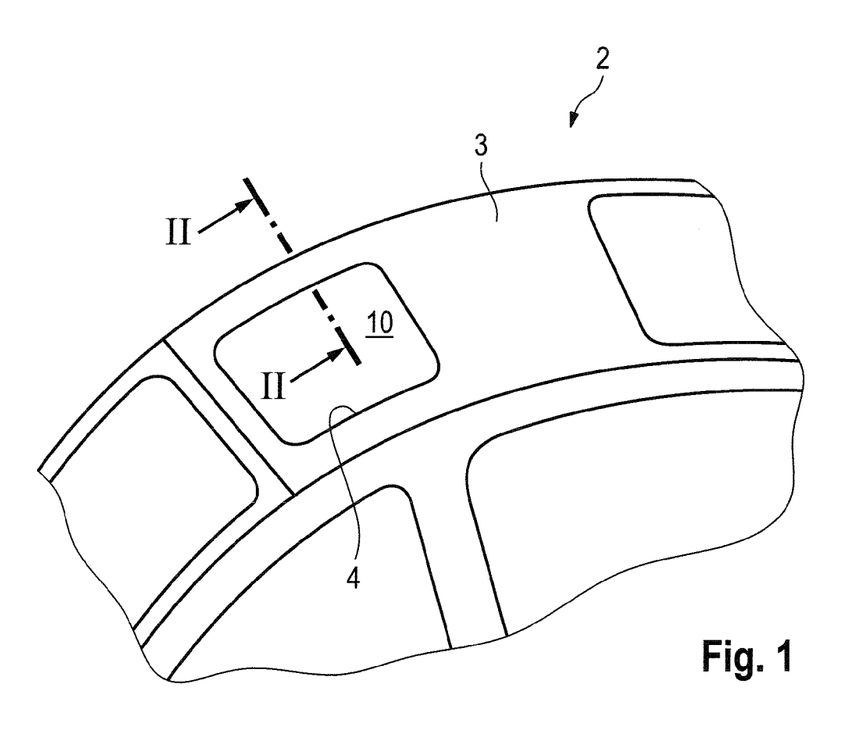
FIG. 1 schematically shows a vehicle roof of a motor vehicle.

FIG. 1 schematically shows a roof 2 of a motor vehicle, which has a roof opening 4 in a roof skin 3. Arranged in the roof opening 4 is a cover 10 of a sliding roof system that is not illustrated in more detail here.

The roof skin 3 may be made of a plastic material or of glass, as is generally known with modern composite module roofs. The roof module preferably is an assembly intended to be connected with the vehicle structure in a preassembled condition, in particular with side beams of the vehicle body and with transverse beams that constitute the upper end of a windshield or of a rear window.

Figure 2:
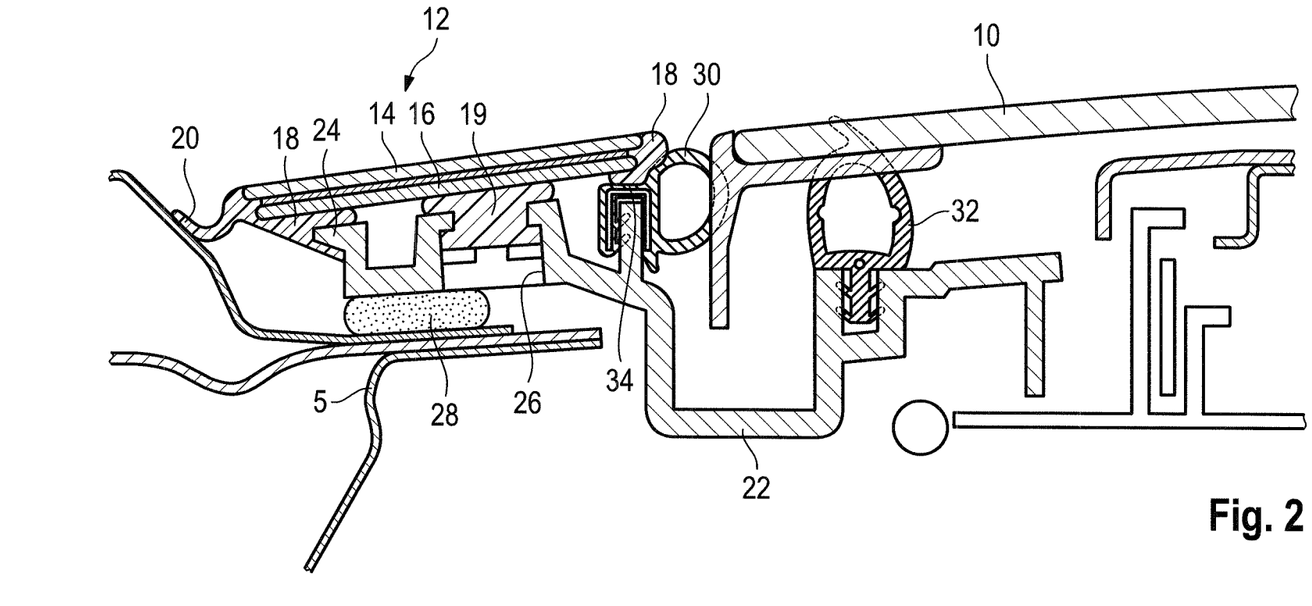
FIG. 2 schematically shows a section along the line II-II of FIG. 1.

As can be seen in FIG. 2, attached to a side beam 5 is a composite part 12 which is formed from two panels 14, 16 adhesively bonded to each other, with the outer panel 14 forming the roof skin.

The composite part 12 formed from the panels 14, 16 is provided with a foamed portion 18 which consists of polyurethane and, for one thing, engages around the front faces of the panels 14, 16, with a sealing lip 20 being integrally molded with the exterior face. The sealing lip 20 rests against the vehicle body.

In addition or alternatively to the foamed portion 18, which engages around an outer edge of the roof element 10, the curable material may also be used to form an integrally foamed portion 19 which adheres to a surface of the roof element 10. The integrally foamed portion 19 serves to firmly connect a rail 22 with the composite part 12. To this end, for one thing, an exterior web 24 of the rail 22 is firmly embedded in the foamed portion 18. For another thing, an opening 26 is provided in the rail 22 through which the integrally foamed portion 19 engages.

The rail 22 firstly serves to connect the composite part 12 firmly with the side beam 5 of the vehicle body. For this purpose, provision is made for an adhesive bead 28 by means of which a connecting surface of the rail 22 is adhesively bonded firmly to the side beam 5. The rail 22 further serves to receive various seals 30, 32 which cooperate with the cover 10, only schematically shown here, of the sliding roof system.

The foamed portion 18 not only functions to fasten the rail 22 to the composite part 12, but also has the purpose of forming a variety of functional formations. For one thing, this is the sealing lip 20 already mentioned, which is configured in one piece with the foamed portion 18. For another thing, the foamed portion 18 is provided with a pressure surface 34 on the interior edge of the composite part 12, the pressure surface 34 cooperating with the seal 30 and pressing the latter onto a holding web on the rail 22.

Figure 3:
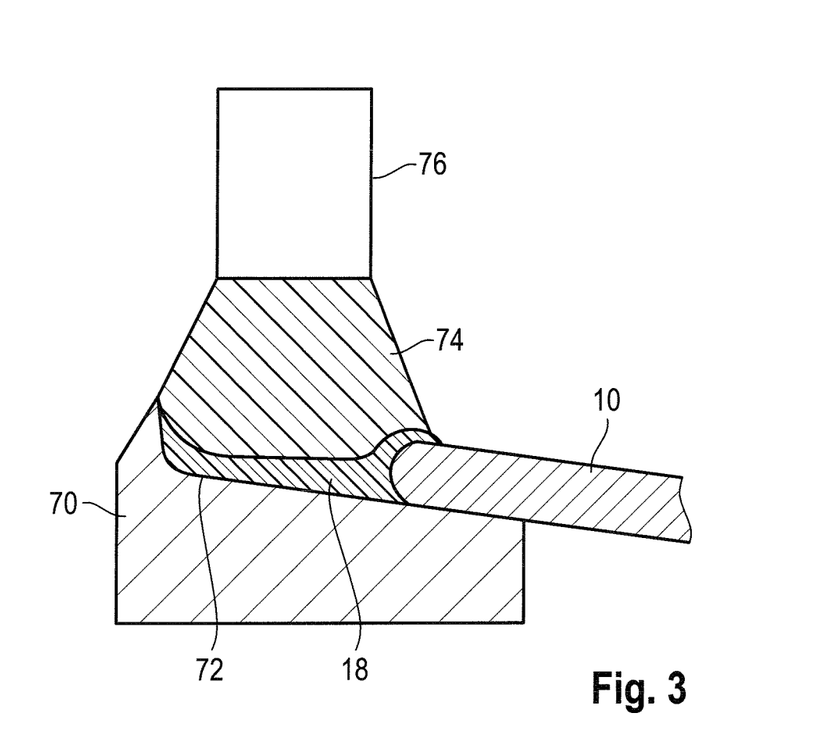
FIG. 3 schematically shows a step in the manufacture of a roof element according to the invention.

FIG. 3 schematically shows the general basic principle of a method that can be used for applying the curable material from which the foamed portion 18 can be produced. This method is disclosed in EP 1 577 080. Here, a mold part 70 is used which has a mold surface 72. The latter is configured to be open to the top and may be generally referred to as dish-shaped in the cross-section shown. The curable material 74 is sprayed into the mold surface 72 by means of a dosing head 76, so that the foamed portion 18 eventually forms on the mold surface 72 and firmly adheres to the cover 10.

Figure 4:
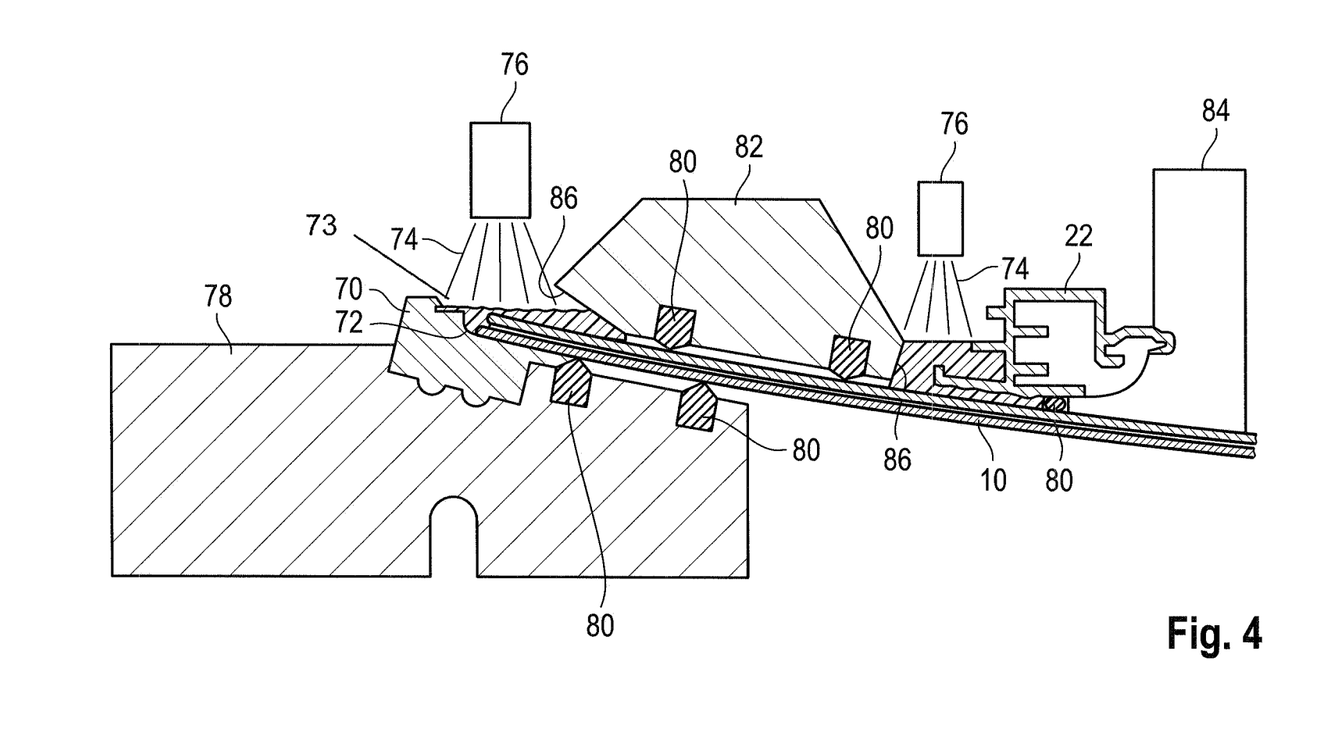
FIG. 4 schematically shows a first step in the manufacture of a roof element according to the invention.
Figure 5:
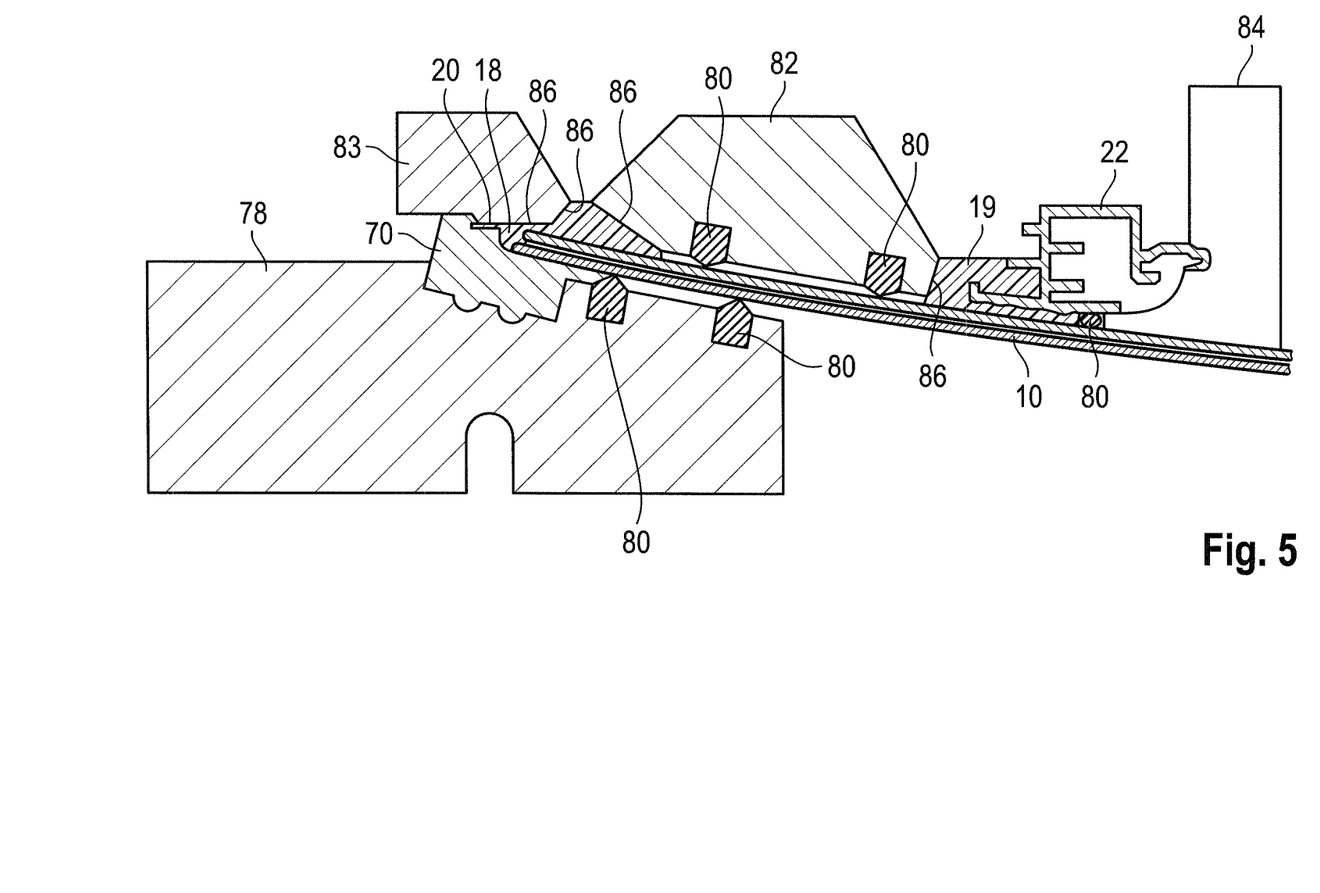
FIG. 5 schematically shows a second step in the manufacture of the roof element of FIG. 4.

FIGS. 4 and 5 show how the curable material 74 is applied in order to provide a roof element as is shown in FIG. 2, for example. Here, too, a first mold part 70 is used which is suitably applied to the roof element 10. The first mold part 70 is placed in a holder 78 here, which is provided with seals 80 that prevent an undesirable escape of the curable material 74. A second mold part 82 which is likewise provided with seals 80 is placed onto the opposite side. Further arranged on this side of the roof element 10 is a holder 84 which holds a rail 22 and is also provided with a seal 80.

For the seals 80 a material is used to which the curable material will not adhere. Silicone is especially suitable.

In a first method step, the curable material 74 is applied onto an open mold cavity 73 of the first mold part 70 and also onto an edge region of the roof element 10 by means of the dosing head 76. The curable material 74 will spread on the first mold surface 72 of the first mold part 70 and on the edge region of the roof element 10 as far as to a second mold surface 86 formed on the second mold part 82. The seals 80 prevent the curable material from spreading onto surface regions in which it is not desired. The curable material 74 is also filled into a region between the rail 22 and the second mold part 82 where it spreads between a further mold surface 86 on the second mold part 82, the surface of the roof element 10, and the rail 22 as far as to the seal 80. The viscosity of the curable material 74 is adjusted here such that it will reliably run under the rail 22, where it will provide for a connection between the roof element 10 and the rail 22.

More particularly, polyurethane is suitable for use as the curable material, in particular the "COLO-FAST R 8959/109/WST" material of BASF.

The curable material 74 is filled in between the second mold part 82 and the rail 22 until the required "filling level" is attained, whereas only a small quantity of the curable material 74 is initially applied onto the region between the first mold part 70 and the second mold part 82. This quantity is essentially determined by the maximum height of the mold surface 72. Subsequently, a movable mold part 83 is applied onto the first mold part 70, the mold surfaces 86 of the movable mold part 83 making sure that the required outer contour is produced there. A further amount of curable material 74 is introduced through the space between the two mold parts 82, 83 until the required "filling level" is attained there as well. In the process, the mold surfaces 86 provided on the second mold parts 82, 83 ensure that further functional surfaces are formed on the foamed portion 18. Finally, a spacer may be placed onto the foamed portion formed in the region between the two mold parts 82, the spacer firmly connecting with the foamed portion 18.

In the two-stage filling-in process that is made use of for manufacturing the foamed portion 18, the movable second mold part 83 is placed onto the first mold part 70 at a point in time at which the curable material has not yet cured to such a degree that deformation thereof would no longer be possible. In addition, it must be ensured that the material applied later between the two mold parts 82, 83 still combines with the material applied already earlier.

By not applying the movable mold part 83 onto the first mold part 70 until a certain amount of the curable material 74 has already been applied there, it is made sure that it is even possible to reliably fill structures having very thin cross-sections. As can be seen in FIG. 5, for example a sealing lip 20 can be formed from the curable material without air being trapped.

Figure 6:
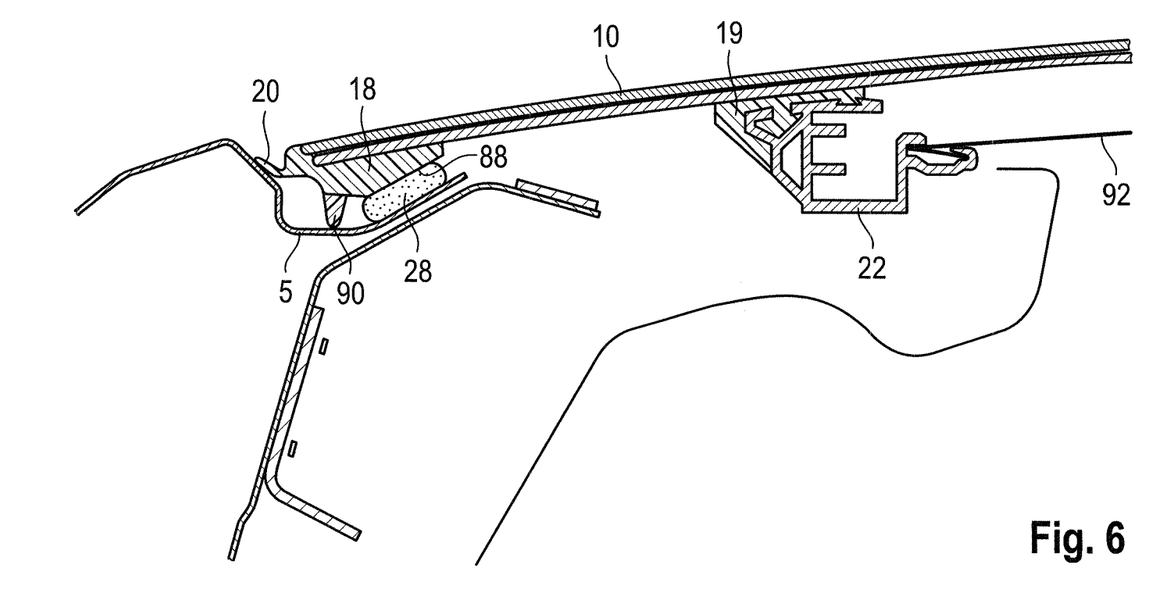
FIG. 6 schematically shows the roof element of FIG. 5 in the assembled condition.

FIG. 6 shows the roof element 10 in the installed condition. One of the outer surfaces of the foamed portion 18, which is molded by a mold surface 86 of the stationary mold part 82, serves as an adhesive surface 88 here, which is firmly attached to a side beam 5 of the vehicle by means of an adhesive bead 28. A spacer 90 applied to the foamed portion 18 ensures the correct positioning of the roof element 10 here. The integrally foamed portion 19 reliably fastens the rail 22 to the roof element 10. Fitted to the rail 22 is, for example, a laterally guided roller blind 92.

Figure 7:
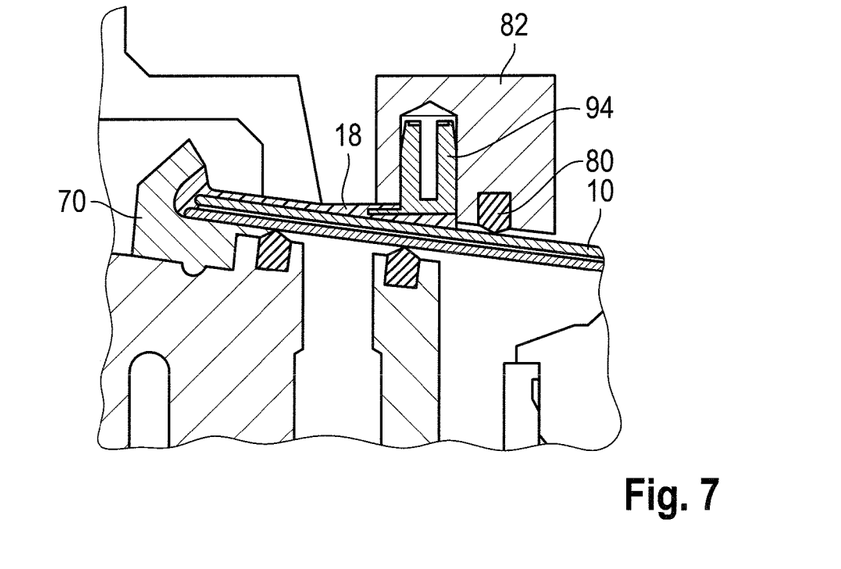
FIG. 7 schematically shows a first variant embodiment.

FIG. 7 illustrates a variant embodiment in which a separate functional part 94, more specifically a centering pin 94, is incorporated into the foamed portion 18. In the initial condition, the centering pin 94 is held within the second mold part 82 and remains firmly embedded in the molded portion 18 after the material applied has cured.

Figure 8:
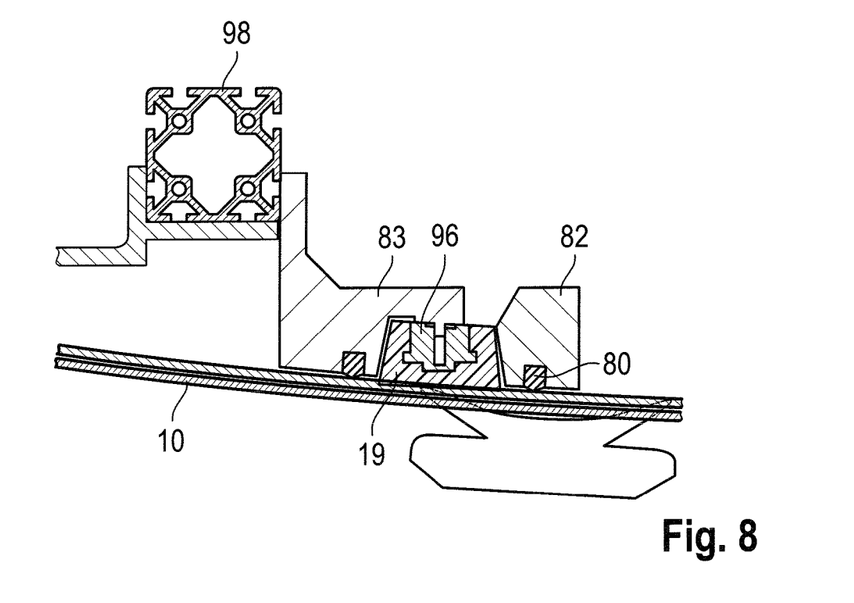
FIG. 8 schematically shows a second variant embodiment.

FIG. 8 shows a further variant embodiment in which a functional part, more specifically a screw-on dome 96, is incorporated in an integrally foamed portion 19; by means of the screw-on dome 96, a roller blind case for the roller blind 92 can later be screwed on to the roof element 10. Here too, the functional part 96 is initially held by the mold part 82 before it is firmly embedded into the integrally foamed portion 19.

Figure 9:
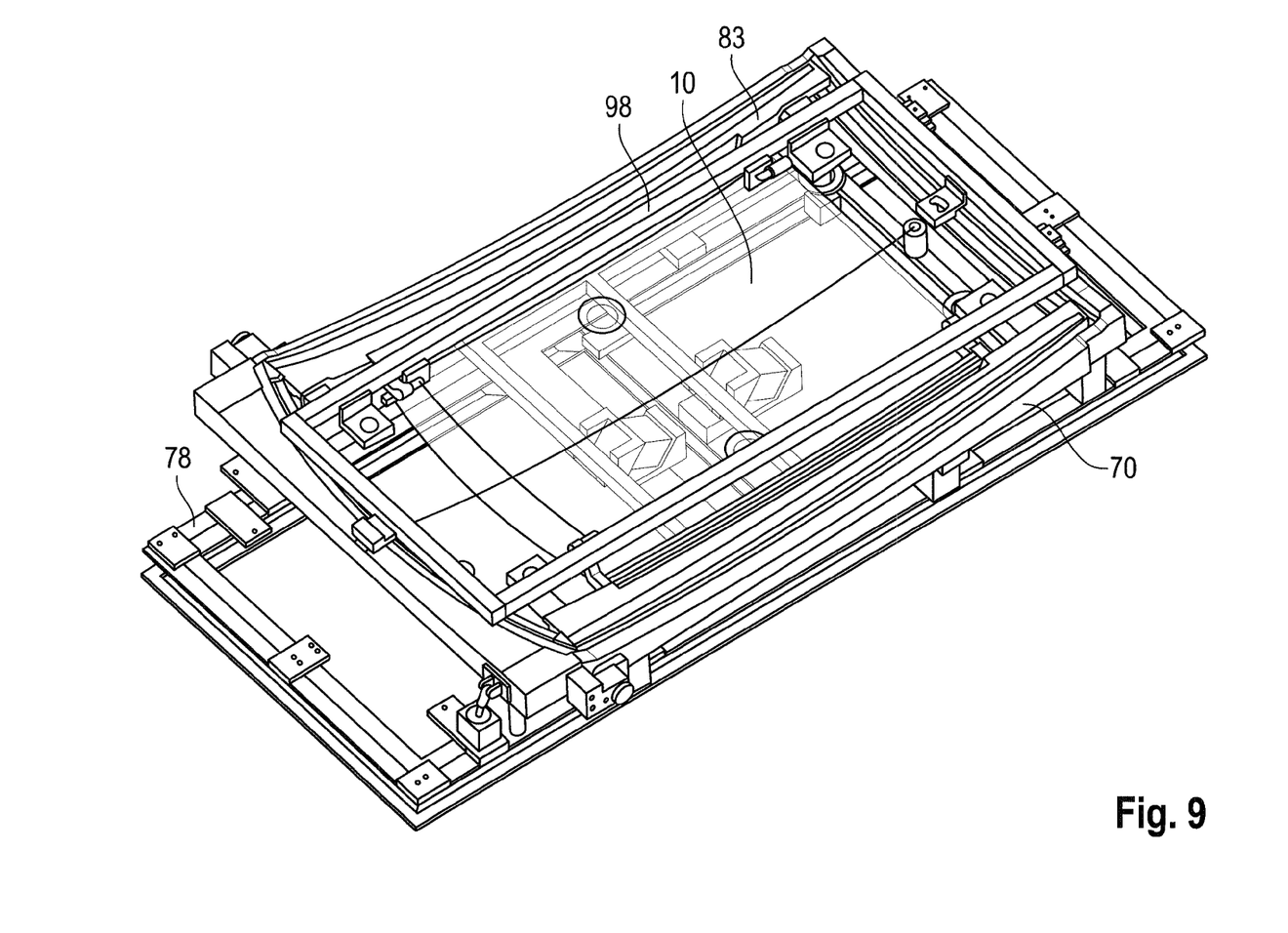
FIG. 9 shows a perspective view of a mold with a roof element placed therein.

FIG. 9 schematically shows a tool by means of which a roof element 10 can be manufactured such as, e.g., a large-area glass cover. The first mold part 70, the movable mold part 83, and a carrier 98 (see also FIG. 8) can be seen here, to which the movable mold part 83 is attached.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of attaching functional components to a roof element of a vehicle, including applying a curable material in a low-viscosity state which is molded in sections in an open mold cavity by a first mold surface and wherein a second mold surface is used which serves for shaping further sections of the curable material, the open mold cavity having an opening through which the curable material can be introduced.

2. The method according to claim 1, wherein the first mold surface is formed on a first mold part.

3. The method according to claim 1, wherein the first mold surface is formed on a functional part which is firmly connected with the roof element by the curable material.

4. The method according to claim 3, wherein the second mold surface is formed on a second mold part.

5. The method according to claim 4, wherein the second mold part is brought into position after part of the curable material was applied onto the first mold surface.

6. The method according to claim 5, wherein the second mold part is used to hold the functional component to be attached in position.

7. The method according to claim 6, wherein the second mold part is two separate parts.

8. The method according to claim 7, wherein the curable material is polyurethane.

9. The method according to claim 7, wherein a seal is used which is made of a material to which the curable material does not adhere.

10. The method according to claim 5, wherein the second mold part is two separate parts.

11. The method according to claim 10, wherein a further amount of the curable material is applied through the opening which is located between the two separate parts of the second mold part.

12. A method of forming a roof element for a vehicle roof with a functional part attached thereto, comprising:
applying a curable material to a portion of the roof element in a low-viscosity state;
molding the curable material in sections in an open mold cavity by a first mold surface and a second mold surface, wherein the second mold surface is defined by a pair mold parts, wherein one of the pair of mold parts is applied to the curable material after it has been applied to the portion of the roof element and an opening remains between the pair of mold parts after they are applied to the curable material, wherein the opening is accessible towards an environment through which the curable material can be introduced.

13. The method of claim 12, wherein the functional part is an integral part of the curable material.

14. The method of claim 13, wherein the functional part is an adhesive surface by means of which the roof element can be adhesively bonded to a vehicle structure.

15. The method of claim 13, wherein the functional part is a sealing lip.

16. The method of claim 12, wherein the functional part is a spacer.

17. The method of claim 12, wherein the functional part is a rail.

18. The method of claim 12, wherein the functional part is a centering pin.

19. The method of claim 12, wherein the functional part is a screw-on dome.

* * * * *